Feb. 10, 1925.

V. E. FISHER

FENDER

Filed Sept. 4, 1923   2 Sheets-Sheet 1

1,525,575

Inventor
V. E. Fisher
By C. A. Snow & Co.
Attorneys

Feb. 10, 1925.
V. E. FISHER
FENDER
Filed Sept. 4, 1923
1,525,575
2 Sheets-Sheet 2
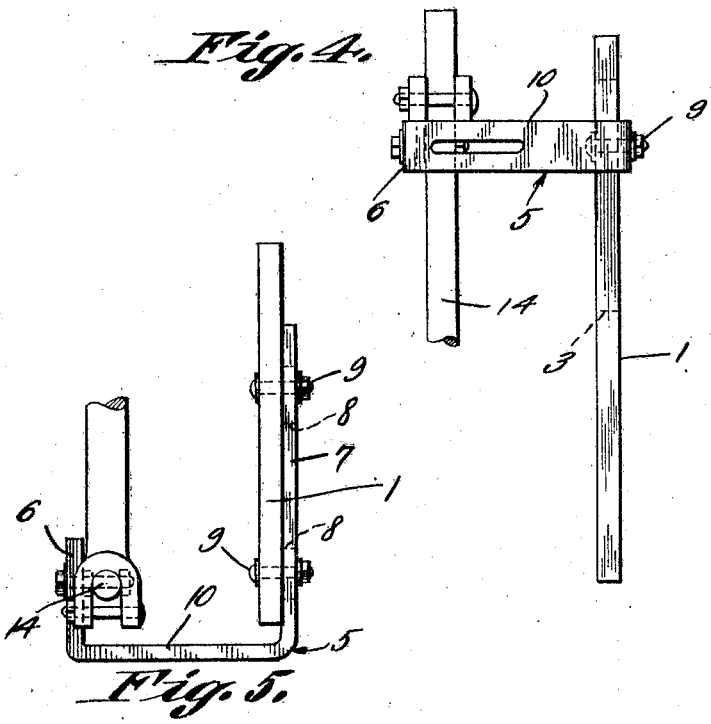
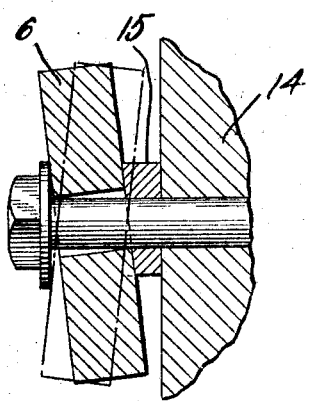
V. E. Fisher,
Inventor
By C.A.Snow & Co.
Attorneys.

Patented Feb. 10, 1925.

1,525,575

UNITED STATES PATENT OFFICE.

VAN E. FISHER, OF BIG SPRING, NEBRASKA.

FENDER.

Application filed September 4, 1923. Serial No. 660,819.

*To all whom it may concern:*

Be it known that I, VAN E. FISHER, a citizen of the United States, residing at Big Spring, in the county of Keith and State of Nebraska, have invented a new and useful Fender, of which the following is a specification.

This invention relates to a plant fender for cultivators of a type to protect plants from the dirt thrown by the shovels.

The object of the invention is to provide a fender of this character which is easily adjusted and permits the shovel to be used in close proximity to small plants without covering them with earth.

Another object is to provide simple and efficient means for securing the fender to a shank or to a disk so that the dirt may be thrown either in or out and which is equipped with means for varying the angle at which the fender is set.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Fig. 4 is a front elevation showing the fender applied to a shovel shank, the shank being broken off.

Fig. 5 is a plan view thereof.

Fig. 6 is a detail sectional view showing the means for varying the angle of the fender.

Fig. 7 is an edge view of the washer used to vary the angle of the fender; and

Fig. 8 is a face view of said washer.

Figure 1:
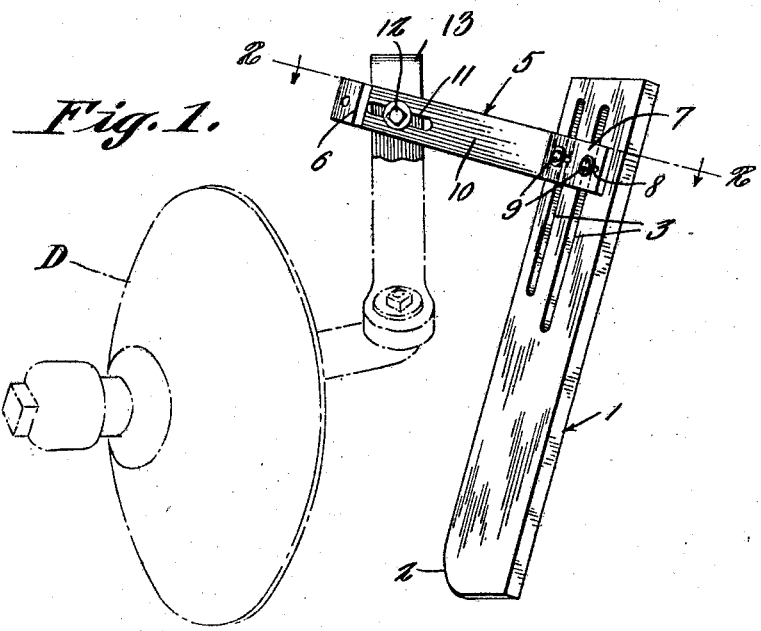
Figure 1 represents a front elevation of a cultivator disk with this improved fender shown applied.
Figure 2:
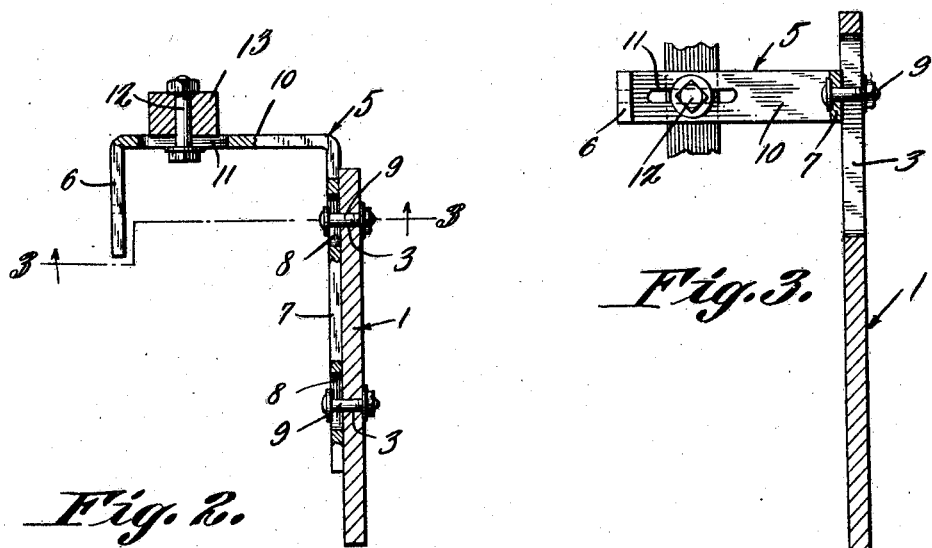
Fig. 2 is a horizontal section taken on the line 2—2 of Fig. 1.
Figure 3:
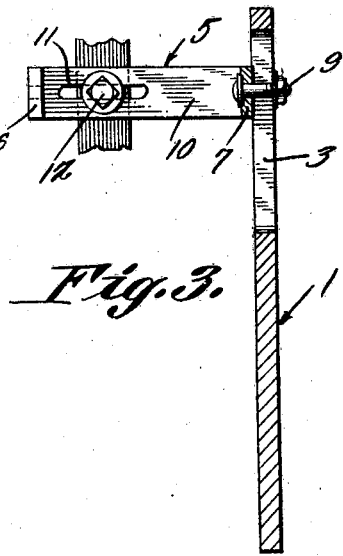
Fig. 3 is a section taken on the line 3—3 of Fig. 2.

In the embodiment illustrated, in Figs. 1 to 3 the fender 1 constituting a part of this invention is shown attached to a cultivator disk D. This fender is made in the form of a rectangular plate of any suitable material preferably of wood with its rear corner rounded as shown at 2. The plate 1 is provided with a plurality of longitudinally extending transversely spaced slots 3 to provide for the vertical adjustment of the fender to adapt it for use in various positions and with plants of different sizes.

The attachment 5 for connecting the plate 1 with the supporting part of the cultivator is here shown constructed of strap iron and made substantially U-shaped in form the leg 6 being shorter than leg 7. Leg 7 has a plurality of longitudinally extending slots 8 formed therein for the reception of the bolts 9 which connect it with the plate 1 said bolts extending through the slots 3 in said plate.

The cross bar 10 has a longitudinally extending slot 11 formed near one end thereof for the reception of the fastening bolt 12 used to connect the attachment to a cultivator disk support as shown in Fig. 1. The arm 6 of the attaching bracket 5 is intended for use in connecting the fender to the shank of a cultivator shovel as shown in Figs. 4 and 5 and which will be hereinafter more fully described.

It will be obvious that the plate 1 may be adjusted toward or away from the disk D owing to the bolt and slot connection of bracket 5 with the support 13.

The plate 1 is adjustable vertically relatively to the bracket by means of the longitudinally extending slots 3. The leg 7 also has longitudinally extending slots 8 therein for the passage of the bolts 9 and which permit plate 1 to be adjusted longitudinally on the leg.

In the form in Figs. 4 to 8 the structure of the fender 1 and the attachment 5 is the same as that shown in the figures above described, the method of application being different the arm or leg 6 of bracket 5 being employed for bolting the attachment to the shovel shank 14, the slotted cross bar 10 having no connection with the supporting member in this application of the device.

To provide for setting the fender at different angles, a wedge-shaped washer 15 is provided one face being rectilinear as is shown at 16 while its opposed face is inclined as shown at 17.

In the use of this washer it is applied as shown in Fig. 6 being located on one of the attaching bolts the inclined face 17 being engaged with the plate 1 for varying the angle thereof.

In the use of this attachment the fender or plate 1 is applied as shown in Figs. 4 and 5 to the shank of the shovel for throwing dirt out while in the other figures the attachment is shown secured to the shank of a disk for throwing dirt in.

This fender is much simpler than the old box fender formerly employed and requires much less material to make it.

Various changes in the form, shape, proportion and other minor details of construction may be made without departing from the principle or sacrificing any of the advantages of the claimed invention.

I claim:—

1. A plate fender for cultivators comprising a longitudinally slotted plate, a U-shaped attaching bracket with one leg longer than the other and connected with said plate to extend laterally therefrom, the cross bar of said bracket being longitudinally slotted to adjustably receive a fastening bolt, and means for connecting the short arm of said bracket with a cultivator shovel.

2. The combination of a plate fender for cultivators comprising a substantially rectangular plate having one corner rounded and the upper portion provided with laterally spaced longitudinally extending slots, a substantially U-shaped attaching bracket one leg of which is equipped with longitudinally extending slots adapted to register with the slots in said plate for connection with the plate, the other leg of said bracket and the cross bar having means for connection with a cultivator.

In testimony that I claim the foregoing as my own, I have hereto affixed my signature in the presence of two witnesses.

VAN E. FISHER.

Witnesses:
 OLIVE FISHER,
 LOUIS H. KAUB.